Figure 1:
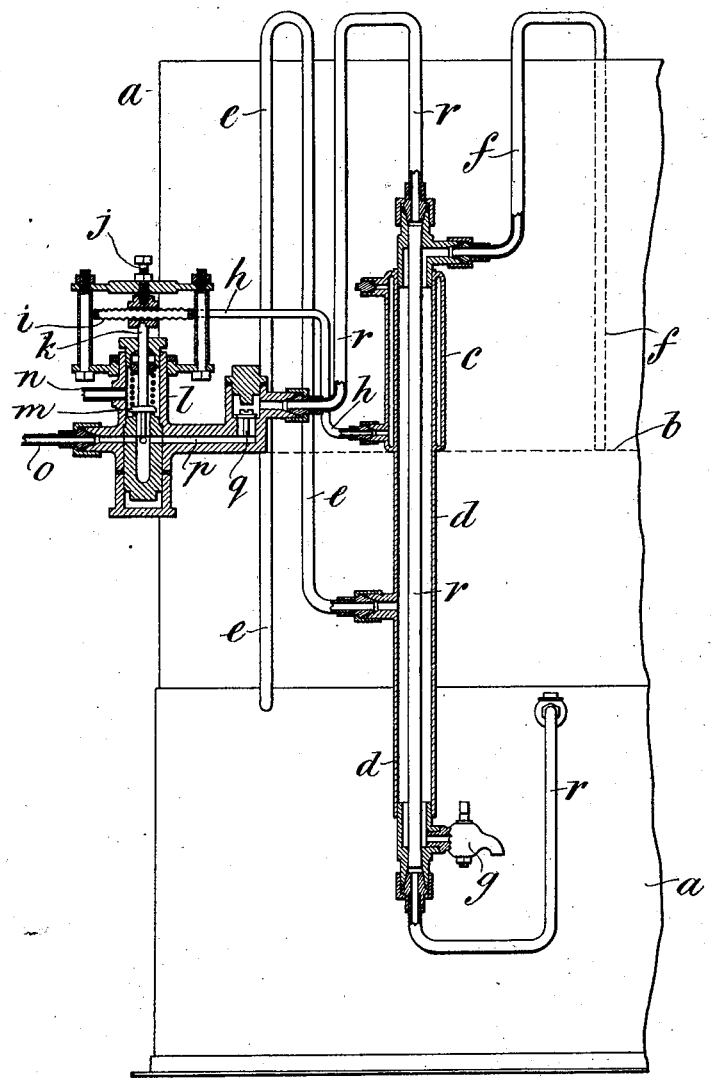

No. 747,908. PATENTED DEC. 22, 1903.
H. A. FLEUSS.
APPARATUS FOR CONTROLLING THE SUPPLY OF FEED WATER TO STEAM BOILERS.
APPLICATION FILED MAR. 30, 1903.
NO MODEL. 6 SHEETS—SHEET 1.

Witnesses.
A. M. Parkins.
E. McFarland.

Inventor.
Henry Albert Fleuss,
By his Attorneys,
Baldwin Davidson Wight.

No. 747,908. PATENTED DEC. 22, 1903.
H. A. FLEUSS.
APPARATUS FOR CONTROLLING THE SUPPLY OF FEED WATER TO STEAM BOILERS.
APPLICATION FILED MAR. 30, 1903.
NO MODEL. 6 SHEETS—SHEET 2.

Witnesses
A. M. Perkins.
E. McFarland.

Inventor.
Henry Albert Fleuss,
By his Attorneys
Baldwin, Davidson & Wight.

No. 747,908. PATENTED DEC. 22, 1903.
H. A. FLEUSS.
APPARATUS FOR CONTROLLING THE SUPPLY OF FEED WATER TO STEAM BOILERS.
APPLICATION FILED MAR. 30, 1903.
NO MODEL. 6 SHEETS—SHEET 3.

Witnesses.
A. M. Parkins
E. McFarland.

Inventor.
Henry Albert Fleuss,
By his Attorneys,
Baldwin, Davidson & Wight

No. 747,908. PATENTED DEC. 22, 1903.
H. A. FLEUSS.
APPARATUS FOR CONTROLLING THE SUPPLY OF FEED WATER TO STEAM BOILERS.
APPLICATION FILED MAR. 30, 1903.
NO MODEL. 6 SHEETS—SHEET 4.

Witnesses.
A. M. Parkins.
E. McFarland.

Inventor.
Henry Albert Fleuss,
By his Attorneys,
Baldwin, Davidson & Wight.

THE NORRIS PETERS CO., PHOTO-LITHO., WASHINGTON, D. C.

No. 747,908. PATENTED DEC. 22, 1903.
H. A. FLEUSS.
APPARATUS FOR CONTROLLING THE SUPPLY OF FEED WATER TO STEAM BOILERS.
APPLICATION FILED MAR. 30, 1903.
NO MODEL. 6 SHEETS—SHEET 5.
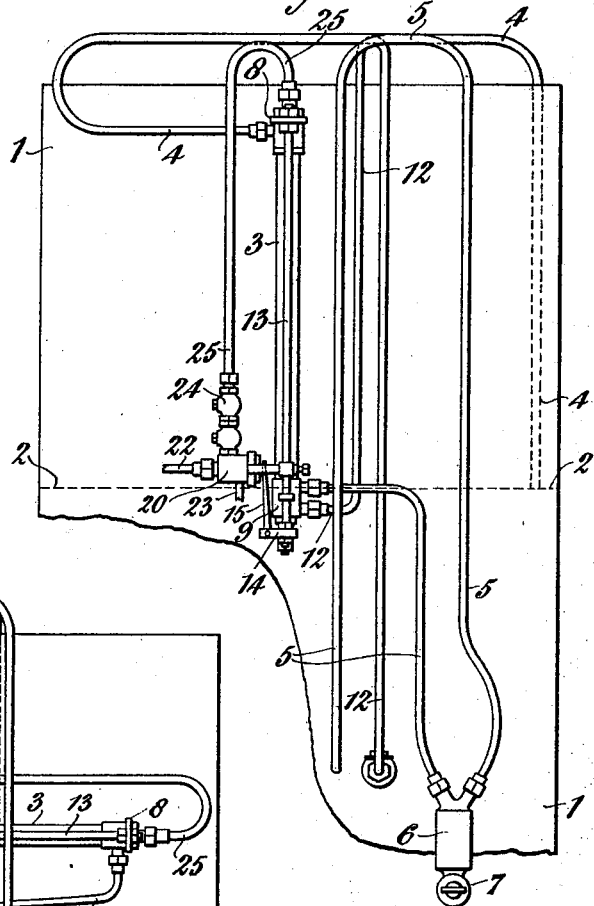
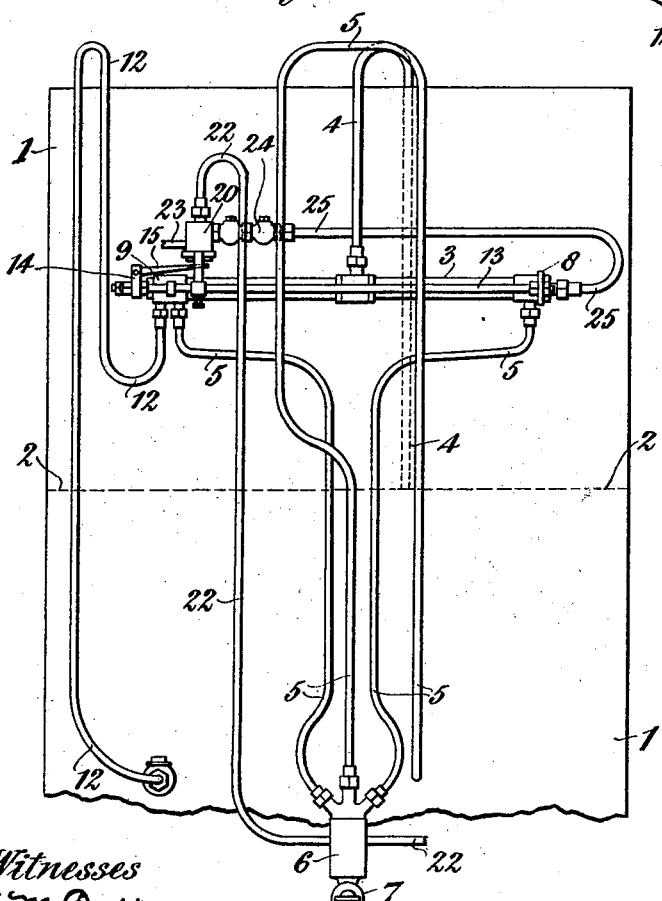
Witnesses
A. M. Perkins
E. McFarland
Inventor
Henry Albert Fleuss
By his Attorneys
Baldwin Davidson Wight

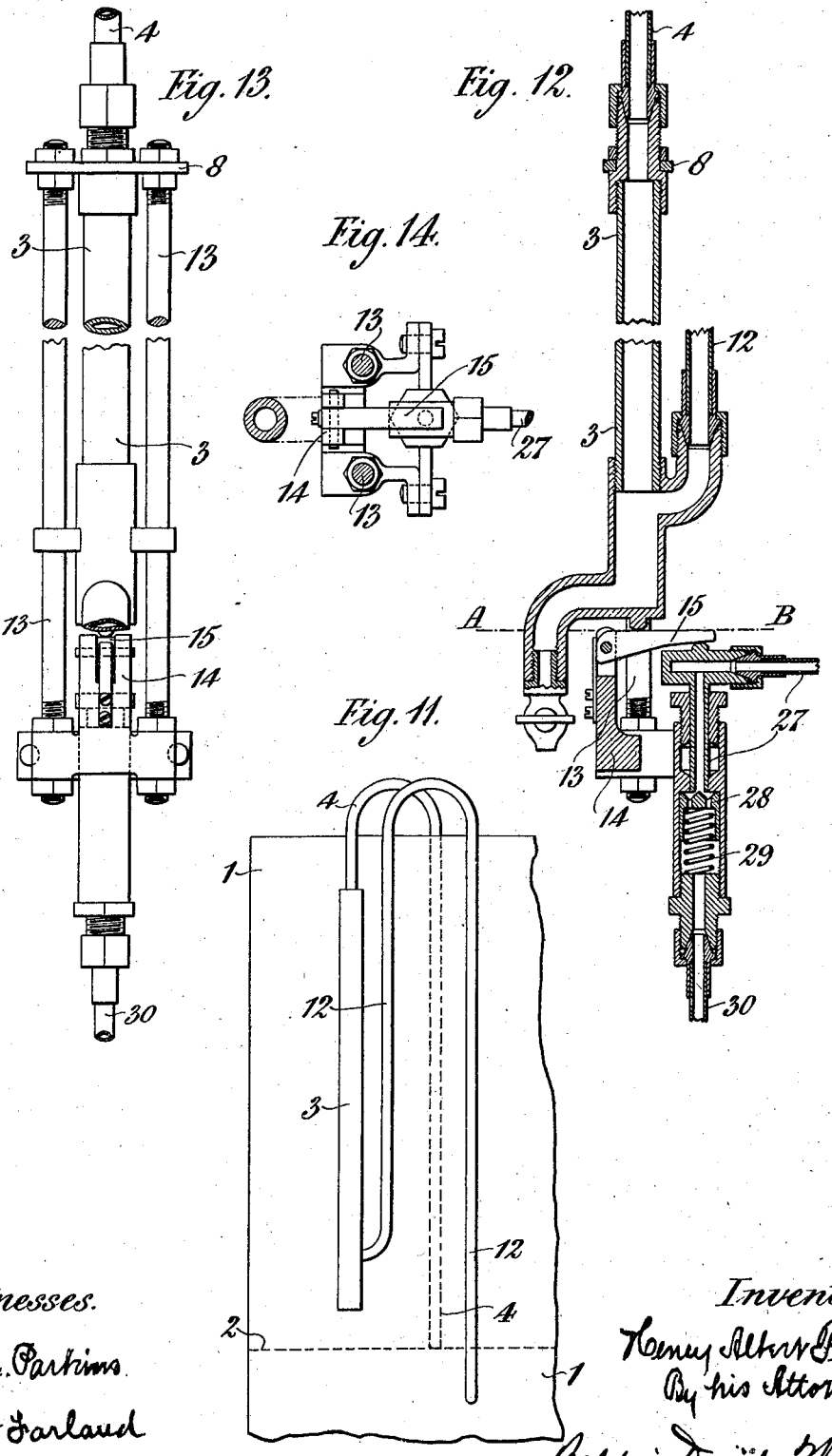

No. 747,908.   Patented December 22, 1903.

UNITED STATES PATENT OFFICE.

HENRY ALBERT FLEUSS, OF STAINES, ENGLAND, ASSIGNOR TO FLEUSS PATENT AUTOMATIC BOILER FEED AND MOTOR CAR SYNDICATE, LIMITED, OF LONDON, ENGLAND.

APPARATUS FOR CONTROLLING THE SUPPLY OF FEED-WATER TO STEAM-BOILERS.

SPECIFICATION forming part of Letters Patent No. 747,908, dated December 22, 1903.

Application filed March 30, 1903. Serial No. 150,284. (No model.)

*To all whom it may concern:*

Be it known that I, HENRY ALBERT FLEUSS, engineer, a subject of the King of Great Britain, residing at The Priory, Knowle Green, Staines, in the county of Middlesex, England, have invented certain new and useful improvements in apparatus for controlling the supply of feed-water to steam-boilers or of fuel to heating-furnaces and other like uses, of which the following is a specification.

This invention relates to apparatus in which a closed chamber outside the boiler and above the water-level has steam admitted to it when the water-level in the boiler is too low or becomes filled with water when the water-level rises above the normal and in which steam when admitted heats the thermostatic apparatus to operate, say, for example, a valve for controlling the supply of water to the boiler, while when water is admitted the thermostat cools and reverses the action of the valve. When such a thermostatic chamber is alternately filled with water and emptied through a single passage at water-level in boiler, the chamber being of necessity above the water-level will when full of water be constantly receiving heat from the boiler by convection, thus limiting the definite action of the apparatus, or if such a thermostatic chamber be connected with the boiler by two pipes, one passed upward from one of its ends into the steam-space of the boiler and then led downward and made to terminate at the water-level, while the other is led downward directly to the lower part of the boiler below the water-level, the chamber when full of water will be kept heated by direct circulation of water from the boiler through the chamber, thereby heating the thermostat, and so continuing the supply of feed-water to the boiler instead of the supply being cut off, as it should be. To prevent this, I according to this invention cause the two pipes leading from the chamber to the boiler to be both led for a distance upward above the chamber before being led downward into the boiler or into a vessel which is in connection with the boiler. One pipe is first led upward from the chamber and then downward into the boiler and made to terminate at the water-level. The other pipe is first led downward from the chamber to a distance below the water-level and then upward to a distance above the chamber before being led downward and into the boiler and made to terminate below the water-level. By leading this pipe downward and upward in the above way the pipe will always remain full of water and will act as a siphon to empty all water from the chamber whenever the end of the other pipe is open to steam, and so long as this pipe remains open to steam any water resulting from condensation of steam in the chamber will be at once siphoned off. By leading both pipes upward before leading them downward into the boiler all heating of the water with which the chamber may at any time be filled is entirely prevented. The water in the chamber will not be heated by convection, as heating by convection will not take place downward; nor will the water be heated by direct circulation of water to and from the boiler, as the two columns of hot water extending through the two pipes which rise upward from the boiler would balance one another, while in the descending portions of these pipes the water would be cold and the two cold columns would balance one another. There would therefore be little if any tendency for circulation to be set up. Even if there were any slight tendency for water to circulate in one direction or the other through the pipes and a slight circulation did take place its effect would be inappreciable, because no circulation could take place unless cold water were displaced from the cold portions of the pipes and made to travel downward along the hot portion of one or other of the pipes, and as the water in these hot portions of the pipes is constantly being heated from the boiler by convection or otherwise and the water in the cold portion of the pipes is constantly being cooled, as these pipes are exposed to the air, there will be but little if any alteration of temperature in the various parts of the pipes by direct circulation of water to and from the boiler.

For the thermostat I employ, as hereinafter described, in some cases a vessel of small capacity and large area containing vaporizable liquid or employ, as hereinafter described, a thermostat acting by the expansion and contraction of metal when heated and cooled.

The thermostatic mechanism may be employed either for controlling the action of valves for governing the supply of feed-water to the boiler or for actuating steam-valves for starting or stopping feed-water-supply pumps or for starting injectors, or it may be employed for cutting off the supply of liquid or gaseous fuel from burners used for heating the boiler should the water-level in the boiler get too low for safety or for other like uses.

My improvements are shown in the drawings annexed.

Figure 2:
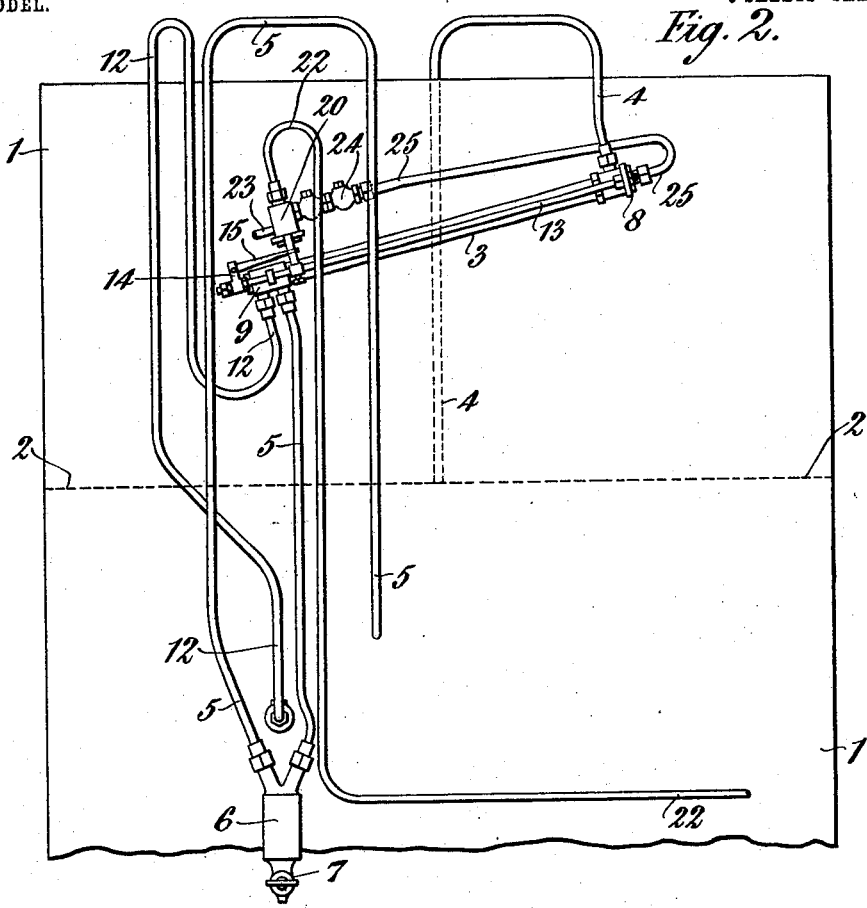
Figure 10:
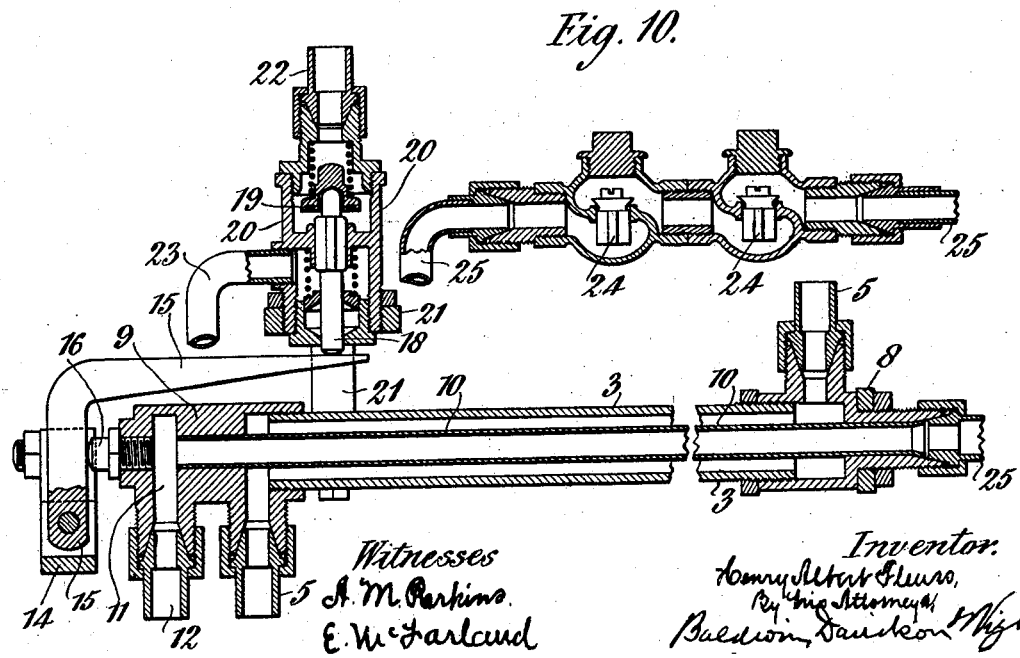
Figure 3:
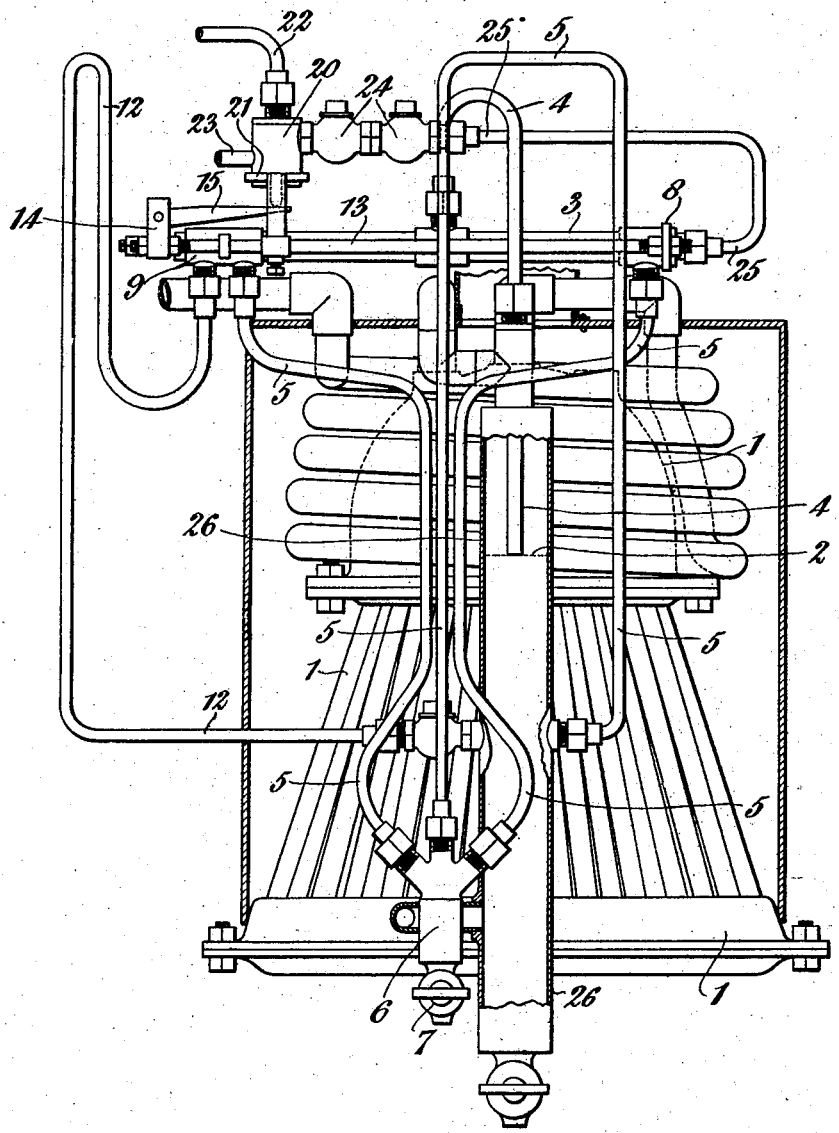
Figure 4:
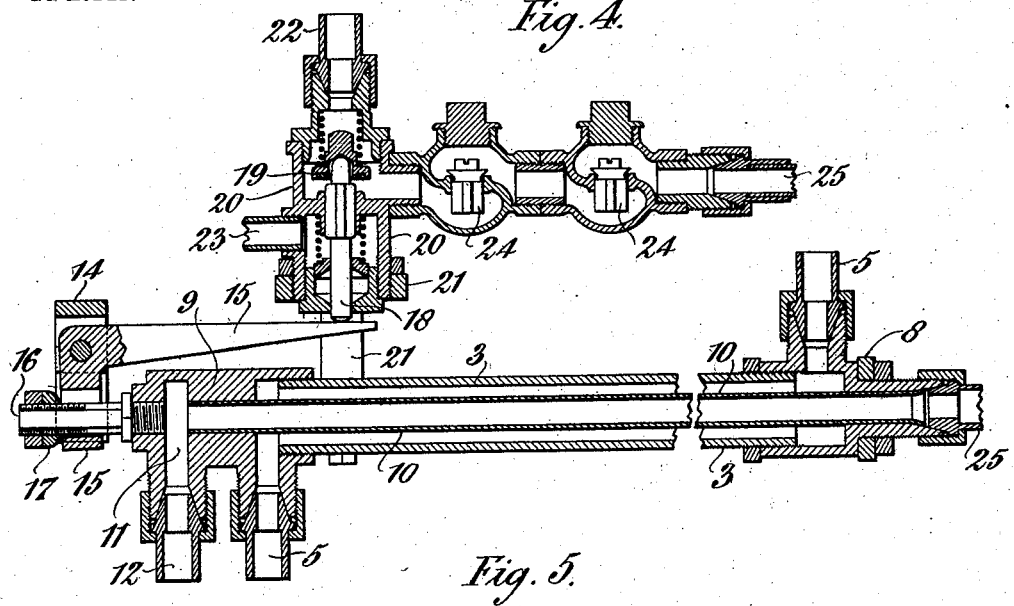
Figure 5:
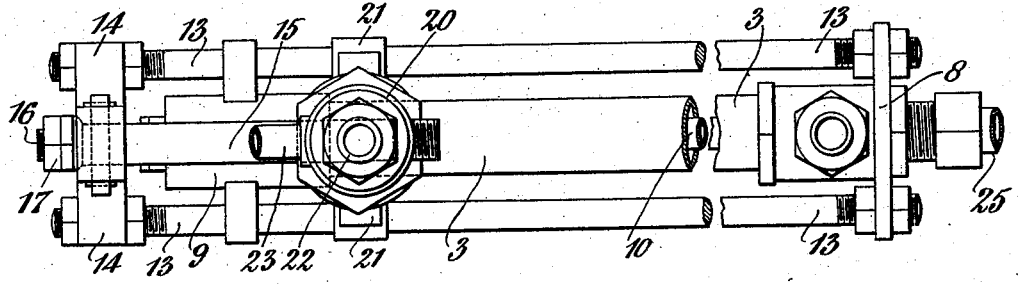
Figures 6, 7:
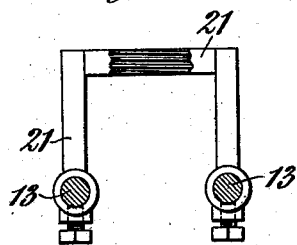

Figure 1 is a side elevation of part of a steam-boiler having applied to it vaporizable liquid thermostatic feed-water-control mechanism arranged according to my invention, the thermostatic mechanism being shown mainly in section. Fig. 2 is a side elevation of part of a steam-boiler having applied to it metallic thermostatic feed-water-control mechanism arranged according to my invention. Fig. 3 is a side elevation of part of a steam-boiler having similar thermostatic mechanism applied to a water-chamber outside the boiler, but so connected to it that the water-level is the same in both. Fig. 4 is a longitudinal section, on a larger scale, of part of the thermostatic mechanism. Fig. 5 is a plan view of the same. Fig. 6 is an end view, partly in section, of the same; Fig. 7, an end view, partly in section, of the bracket by which the valve mechanism is carried. Fig. 8 is a side elevation of a modification of the arrangement shown in Fig. 2. Fig. 9 is a side elevation of another modification of this arrangement. Fig. 10 is a modification of the arrangement shown in Fig. 4. Fig. 11 is an elevation of similar metallic thermostatic mechanism adapted to close a valve to cut off supply of liquid or gaseous fuel from the burner used for heating the boiler should the water-level in the boiler get so low that injury to the boiler might arise. Fig. 12 is a vertical section, on a larger scale, of the same. Fig. 13 is an elevation of the same; and Fig. 14, a section on the line A B, Fig. 11.

In Fig. 1, $a$ is the outer casing of the boiler. The dotted line $b$ indicates the water-level in the boiler. $c$ is an annular vessel of small internal capacity the inner and outer side walls of which are formed of two concentric tubes of different diameters, one within the other. $d$ is the inner tube of this vessel, extended for some distance downward. $e$ is a branch pipe led out from the downward extension of the tube $d$ at a point below the water-level in the boiler. The branch pipe $e$ is, as shown, first led upward to some distance above the annular vessel $c$ and then downward and made to open into the boiler below the water-level. $f$ is a branch pipe led off from the top of the tube $d$ and similarly first led upward for a distance and afterward led down through the steam-space of the boiler and made to terminate at the water-level. $g$ is a cock on the lower end of the tube $d$, by which any sediment collecting in the tube can be drawn off. $h$ is a pipe leading from the lower part of the annular vessel $c$ to a flexible metallic case $i$. This case and the pipe $h$ are filled with liquid. The annular vessel is also nearly filled with liquid which is readily vaporizable. $j$ is a screw the lower end of which forms an abutment for the central portion of the upper side of the metallic case to rest against. $k$ is a rod extending downward from the center of the lower side of the case. This rod extends downward through a stuffing-box into the interior of a valve-chamber $l$. $m$ is a feed-water relief-valve upon which the lower end of the rod $k$ rests. $n$ is a waste-pipe by which any water that passes this valve can flow away. $o$ is a feed-water-supply pipe through which feed-water is supplied continuously by a feed-pump or otherwise. $p$ is a passage through which the feed-water can pass to the boiler. $q$ is a non-return valve on this passage. $r$ is a pipe led away from the end of the passage $p$ to the upper end of the tube $d$ and then downward through the entire length of this tube and afterward a distance upward and then into the boiler at a point below the water-level.

The action is as follows: Whenever the water-level in the boiler gets below the lower end of the pipe $f$, the water with which this pipe was previously filled and the water in the upper part of the tube $d$ is siphoned off through the bent tube $e$, which always remains filled with water, and the water so siphoned off is delivered into the lower part of the boiler, while the upper part of the tube $d$ becomes filled with steam. The liquid in the annular vessel $c$ thereby becomes heated. Part of it is vaporized, and the pressure thus generated expands the flexible case $i$ and holds the valve $m$ down onto its seat. The feed-water arriving by the feed-water-supply pipe $o$ is therefore compelled to pass to the boiler through the pipe $r$, and as it does so it serves to cool the water contained in the lower part of the tube $d$. If desired, all the feed-water supplied by the pump might be made to pass through the pipe which extends centrally through the chamber in place of only passing through it the water which is to be passed into the boiler. When the water-level in the boiler has again risen above the lower end of the pipe $f$, the steam in this pipe and in the upper part of the tube $d$ rapidly cools and condenses, and these parts become again filled with water, mainly with cool water sucked up from the lower part of the tube $d$. The annular vessel then rapidly cools, the valve $m$ is no longer held down onto its seat, and the feed-water arriving by the feed-water-supply pipe o passes away by the waste-pipe n. So long as the upper part of the tube d remains filled with water all circulation of water through it from the boiler is practically, if not entirely, stopped, as although the water in the portion of the pipe e which rises upward from the lower part of the boiler will become heated by convection, as also the water in the portion of the pipe f which is within the boiler, the water in the continuation of the pipe e, which is carried downward to below the water-level in the boiler, and the water in the descending portion of the pipe f and in the pipe d will not be heated. The ascending columns of hot water more or less balance one another. The descending columns, which are to remain cool, also more or less balance one another, so that practically there is no tendency for circulation to be set up and in addition the water in the descending columns cannot be heated by convection, as heating by convection will not take place downward. Should there be any slight tendency for circulation to be set up by reason of one of the hot pipes being hotter than the other or one of the cold pipes colder than the other, the circulation would be very slow. As also the water in both of the ascending columns is continuously being heated and in both of the descending columns is continuously being cooled by exposure to air, practically little, if any, variation in temperature of the hot and cold columns of water will be caused by circulation.

In place of arranging the thermostatic apparatus to act upon a relief-valve to allow the feed-water to escape freely when it is not required to be allowed to pass to the boiler the valve operated on by the thermostatic apparatus might be a supply-valve, which when opened would allow water to pass to the boiler. In this case a relief-valve, loaded to somewhat above the pressure in the boiler, would be provided to allow the excess feed-water supplied from the pump to pass away.

In the arrangement shown in Figs. 2, 3, 4, 5, 6, and 7 the thermostat is a metallic one and continuous circulation of water past thermostatic mechanism at the time when the water-level in the boiler is above the level required is entirely prevented in the same way to that above described.

In Fig. 2, 1 is a portion of a steam-boiler. The dotted line 2 indicates the water-level in the boiler. 3 is a metallic tube, preferably of aluminium, situated outside the boiler and above the water-level. 4 is a pipe led from one of its ends into the steam-space of the boiler and then downward and made to terminate at the water-level. 5 is a pipe led downward from its other end to below the water-level and then upward and again downward before it is led into the boiler below the water-level. 6 is a mud-pocket at the point where the pipe 5 after being led downward is again led upward. 7 is a cock for drawing off sediment from this mud-pocket. 8 is a bracket projecting outward from two opposite sides of one end of the metallic tube 3, and 9 is a block closing the opposite end of the tube 3. The interior of the tube 3 therefore forms a chamber which is filled either with water or steam, according as the water-level in the boiler rises or falls. 10 (see Fig. 4) is a pipe extending lengthwise through the tube 3. One end of it is fixed in a block which closes one end of the tube, and to this end feed-water for the boiler is supplied. The other end of the tube 10 fits with a sliding fit into a hole in the block 9, which closes the other end of the tube. This latter end of the pipe 10 opens into a passage 11, formed in the block, from which a pipe 12 is led away and bent upward to prevent the water in it being heated by convection and is then again led downward and into the boiler below the water-level. In place of the pipe which passes centrally through the chamber having one of its ends free to slide to and fro in a corresponding hole in one end of the chamber the two ends of the pipe might be fixed in the two ends of the chamber, the pipe in this case being formed with transverse corrugations, so that it may expand and contract freely. 13 13 are rods extending from the bracket 8 to beyond the block 9. 14 is a bracket secured to the ends of the rods. It carries a bent lever 15. A projection 16 from the block 9 passes through a slot in the short arm of this lever, and a nut 17, screwed onto its end, bears against this arm. The longer arm of the lever 15 bears against the lower end of a rod 18 to open a feed-water relief-valve 19. The casing 20, within which this valve works, is secured to the rods 13 by a bracket 21. 22 is a feed-water-supply pipe opening into the top of the casing. 23 is a waste-pipe by which the feed-water can be led away when the water-level in the boiler is above the normal. 24 24 are non-return valves past which the feed-water has to travel before it enters the pipe 25, which leads to the end of the pipe 10. It is desirable to use two or more such valves in series, as shown, to insure that there shall be no backward leakage of water from the boiler, so that if for a time one or other of the valves is prevented from closing properly (by grit or otherwise) the other or others may be available for preventing backward flow. The action of the apparatus so far as regards the filling of the tube or chamber 3 with water or steam according as the water-level in the boiler rises or falls and for preventing circulation of water through at times when it is filled with water is the same as in the apparatus first described. When the chamber is filled with steam, the tube 3 expands and allows the feed-water relief-valve to close. The feed-water is then compelled to pass the valves 24 and through the pipes 25, 10, and 12 to the boiler. When the chamber is filled with water, the tube 3 cools and contracts, and the nut 17 on the projection 16, which extends from its end, bears against the short arm of the lever 15, and so lifts the longer arm of this lever, and thereby opens the relief-valve 19 and allows the feed-water to escape without passing to the boiler. If the crank-lever were arranged to open a feed-supply valve, the expansion thrust of the tube would be arranged to open the valve and its contraction caused to close it. If the expansion thrust is in any case used to close a valve, a spring would have to be interposed between the valve and the thermostat.

In the modification of the above apparatus shown in Fig. 3 the tube 3 is set horizontally instead of being inclined, as in Fig. 2. In this case it is desirable that the tube 4 should open into the upper part of some central portion of the tube 3, while tubes 5 are led away from the lower part of its two ends. Both these tubes 5 are, as shown, led downward to a mud-pocket 6, provided with a draw-off cock 7, and another pipe serving as a continuation of both tubes 5 is led upward from this mud-pocket and then again downward before it is led into the boiler below the water-level. In the arrangement shown in this figure it is not led directly into the boiler, but into a chamber 26, which at its upper and lower ends is open to the boiler, so that the water within it stands at the same level as in the boiler. The lower end of the chamber 26 forms a mud-pocket and is, as shown, provided with a draw-off mud-cock. The pipe 12, through which feed-water is to pass to the boiler, is also led, as shown, into the chamber 26 below the water-level. The tube 4 is also led downward into the chamber 26. This arrangement is especially applicable for water-tube boilers in which the ebullition is so rapid that there is no well-defined line of water-level within the boiler. Another advantage of the arrangement is that any sediment deposited in the boiler is repeatedly being drawn off from the bottom of the boiler into the chamber 26 and collecting in the mud-pocket at its lower end can from time to time be drawn off through the draw-off cock at the bottom of this pocket. The reason why water is being repeatedly drawn from the boiler into the chamber 26 and there for a time allowed to remain at rest and deposit any sediment carried into the chamber along with it is that whenever the chamber 3 gets filled with water this water must necessarily be drawn from the chamber 26 and be replaced by water drawn from the bottom of the boiler. It is also advantageous that the feed-water should be delivered into this chamber 26, so that any solid matter precipitated from the feed-water as the water becomes heated may settle down into the mud-pocket at the bottom of the chamber and never pass into the boiler itself.

In Fig. 8 the same arrangement of horizontal tube 3 is shown; but the feed-water pipe and the pipes leading from the tube 3 pass into the boiler itself and not into an outer chamber 26.

In Fig. 9 the tube 3 is set in a vertical position.

In all the above Figs. 2 to 9 the thermostatic mechanism is shown as acting on a feed-water relief-valve. With such an arrangement the valve when closed would always be held down onto its seat by a pressure somewhat greater than the pressure in the boiler and the valve would have to be opened against this pressure. By the modification shown in Fig. 10 this can be obviated. In this modification the pipe 22 serves as a water-supply pipe. The pipe 23 passes to the suction-inlet of a feed-water pump, and all water delivered by the pump is made to pass to the pipe 25, and so past the non-return valves 24 to the boiler. The thermostat when heated would, as shown, be arranged to lift the valve 19 and allow water to pass to the pump; but when the thermostat-pipe 3 fills with water and cools the valve is allowed to close and cut off all water-supply from the pump, so that no more can be delivered by it. In this way the pressure upon the valve 19 must always be less than atmospheric pressure.

In all the Figs. 2 to 10 the parts which are similar are marked with the same characters of reference. In all these figures, as well as in Fig. 1, I have shown the pipe which is led upward from the lower part of the boiler below the water-level to what I have called the "chamber" as being led upward outside the boiler. In practice this has been found sufficient to prevent any material circulation of water being set up through the chamber; but if it is desired the pipe may be led upward inside the boiler in the same way as shown in regard to the pipe which is led up from the water-level. In this way the temperature of the water in the two ascending pipes would be kept absolutely the same and all tendency for circulation to be set up would be entirely done away with.

Figs. 11, 12, 13, and 14 show similar thermostatic apparatus adapted for cutting off the supply of liquid fuel from burners used for heating the boiler. As shown in Fig. 11, the tube 3 is set vertically. The pipe 4 is led up from its upper end and then downward into the boiler and made to terminate at a level below which the water-level cannot be allowed to fall without risk of injury to the boiler. The pipe 12 is led upward from the lower end of 3 and then downward and led into the boiler below the level at which 4 terminates. Normally 3 remains full of water, which will remain cold for the reasons above given; but if the water falls below the end of the pipe 4 the water in the tube 3 is siphoned off through the pipe 4 and the tube 3 becomes filled with steam, and is thereby heated and caused to elongate. As it elongates it presses downward the lever 15, and thereby forces downward an oil-supply tube 27 against a valve 28, and thereby closes the end of the oil-supply pipe and prevents oil passing to the burners used for heating the boiler. Normally the valve is kept pressed upward by a strong spring 29 against a fixed collar; but if the lever 15 continues to be pressed downward after the end of the tube 27 has been brought against the valve 28 the spring yields and prevents the parts of the mechanism from being injured. 30 is a pipe by which oil is allowed to pass to the burners when the end of the tube 27 is not closed by the valve 28.

What I claim is—

1. In apparatus for controlling the supply of feed-water to steam-boilers or for like uses, the combination of a steam-boiler, a chamber outside the boiler above the water-level, two pipes passing from it one led upward for a distance and then downward into the steam-space of the boiler and made to terminate at the level below which the water-level is not to be allowed to descend, the other also led upward for a distance and then downward to the lower part of the boiler and made to terminate at a lower level, thermostatic mechanism alternately heated and cooled as the chamber fills with steam or water, and mechanism acted on by the thermostat.

2. The combination of a steam-boiler, a chamber outside the boiler above the water-level, a pipe passing upward for a distance above the chamber and then downward into the steam-space of the boiler and made to terminate at the water-level, another pipe led downward from the chamber to below the water-level, then upward to a distance above the chamber and then downward and into the boiler and made to terminate below the water-level, thermostatic mechanism alternately heated and cooled as the chamber fills with steam or water, and mechanism acted on by the thermostat.

3. The combination of a steam-boiler, an expansible metallic tube outside the boiler above the water-level, two pipes passing from it one led upward for a distance and then downward into the steam-space of the boiler and made to terminate at the level below which the water-level is not to be allowed to descend, the other also led upward for a distance and then downward into the boiler and made to terminate at a lower level, a rigid frame to which one end of the tube is secured, a lever jointed to this frame and acted upon by the opposite end of the tube, and mechanism acted on by the lever as it is rocked by the alternate contraction and expansion of the metallic tube.

4. The combination of a steam-boiler, an expansible metallic tube outside the boiler above the water-level, two pipes passing from it one led upward for a distance and then downward into the steam-space of the boiler and made to terminate at the level below which the water-level is not to be allowed to descend, the other also led upward for a distance and then downward into the boiler and made to terminate at a lower level, a bracket secured to one end of the metallic tube, rods extending from the bracket beyond the opposite end of the tube, a bracket connecting the opposite ends of the rods, a lever jointed to this bracket and acted upon by the opposite end of the tube, and mechanism acted on by the lever.

5. The combination of a steam-boiler, an expansible metallic tube outside the boiler above the water-level, a pipe led upward from it and then downward into the steam-space of the boiler and made to terminate at the water-level, another pipe which after being led from it is led upward and then downward and into the boiler and made to terminate below the water-level, a rigid frame to which one end of the tube is secured, a lever jointed to this frame and acted upon by the opposite end of the tube and mechanism acted on by the lever as it is rocked by the alternate contraction and expansion of the metallic tube, a feed-water-supply pipe, a non-return valve or valves on this pipe, a continuation feed-water-supply pipe extending through the metallic tube and a valve controlling the supply of water to the boiler acted upon by the lever as the tube contracts and expands.

6. The combination of a steam-boiler, a vessel having its upper and lower parts connected with upper and lower parts of the boiler, a chamber outside boiler above water-level, a pipe leading upward therefrom and afterward downward and into upper part of vessel and made to terminate at water-level, another pipe leading from the chamber also led upward for a distance and then downward and into the vessel and made to terminate below the water-level, thermostatic mechanism heated and cooled as the chamber alternately fills with steam and with water, and mechanism acted on by the thermostat.

7. The combination of a steam-boiler, a vessel having its upper and lower parts connected with upper and lower parts of the boiler, a downward continuation of the vessel extending below the bottom of the boiler, a mud-cock on its downward extension, a chamber outside boiler above water-level, a pipe leading upward therefrom and afterward downward and into upper part of vessel and made to terminate at water-level, another pipe leading from the chamber also led upward for a distance and then downward and into the vessel and made to terminate below the water-level, thermostatic mechanism heated and cooled as the chamber alternately fills with steam and with water, and mechanism acted on by the thermostat.

HENRY ALBERT FLEUSS.

Witnesses:
GEORGE I. BRIDGES,
JOHN H. WHITEHEAD.